United States Patent [19]

Melvej

[11] Patent Number: 5,431,944
[45] Date of Patent: Jul. 11, 1995

[54] BATTER MIX FOR FROZEN FOOD PRODUCTS AND METHOD OF MAKING

[75] Inventor: Henning S. Melvej, Seattle, Wash.

[73] Assignee: Bunge Foods Corporation, Seattle, Wash.

[21] Appl. No.: 188,564

[22] Filed: Jan. 28, 1994

[51] Int. Cl.$^6$ .............................................. A21D 10/04
[52] U.S. Cl. ........................................ 426/552; 426/92; 426/95; 426/102; 426/243; 426/562; 426/573; 426/637; 426/643; 426/644
[58] Field of Search ................... 426/92, 94, 95, 102, 426/243, 303, 304, 637, 615, 549, 551, 552, 562, 573, 643, 644, 331

[56] References Cited

U.S. PATENT DOCUMENTS

| | | | |
|---|---|---|---|
| 3,852,501 | 12/1974 | Fazzina et al. | 426/92 |
| 4,529,607 | 7/1985 | Lenchin et al. | 426/94 |
| 4,590,080 | 5/1986 | Pinegar | 426/441 |
| 4,839,182 | 6/1989 | Makashima et al. | 426/242 |
| 4,931,296 | 6/1990 | Shanbhag et al. | 426/243 |
| 4,948,603 | 8/1990 | Bernacchi et al. | 426/95 |
| 5,004,616 | 4/1991 | Shanbhag et al. | 426/102 |
| 5,194,271 | 3/1993 | Yasosky | 426/92 |

OTHER PUBLICATIONS

Anon., "Solving the Problem of 'Microwave Browning'", *Food Engineering*, 53 (9), pp. 98–100, Sep., 1981.

*Primary Examiner*—Helen Pratt
*Attorney, Agent, or Firm*—Marshall, O'Toole, Gerstein, Murray & Borun

[57] ABSTRACT

A batter mix for foodstuffs which provides a reconstituted food product having a tender and crisp exterior and a moist interior. A frozen food product comprising a foodstuff coated with the batter mix, like French fries, can be reconstituted by a variety of heat sources, including a microwave oven.

29 Claims, No Drawings

BATTER MIX FOR FROZEN FOOD PRODUCTS AND METHOD OF MAKING

FIELD OF THE INVENTION

The present invention relates to batter mixes for frozen food products, particularly for frozen food products designed for reconstitution in a microwave oven. The present invention also relates to food products comprising a foodstuff coated with a batter, wherein the food product has a tender and crisp exterior and a moist interior after reconstitution.

BACKGROUND OF THE INVENTION

Conventional reconstitution, i.e., reheating, of a frozen food in a deep fat fryer provides a palatable and esthetically-pleasing food product. Typically, the reconstituted food product is browned, has a crisp exterior and a moist interior. These properties are achieved by the relatively high temperature and relatively long time the frozen food product is heated during reconstitution in a deep fat fryer.

Reconstitution of a frozen food product in a regular oven, a convection over or a microwave oven often provides a reconstituted product that is palatable, but is not esthetically-pleasing. For example, reconstitution in a microwave oven is performed at a low temperature and for a short time. Therefore, the necessary conditions for imparting the appearance, color, texture, taste, aroma, and total eating experience of a food product that has been reconstituted in a deep fat fryer immediately prior to eating are not present. In contrast, reconstitution of a frozen food product in a microwave oven typically provides a food product having a soggy exterior and a tough interior. These properties are the opposite of properties desired by consumers.

Many attempts have been made to duplicate the taste, aroma, color, texture and total eating experience of food products reconstituted in a deep fat fryer. Exemplary processes used in these attempts include pan-frying in oil and oven baking. These efforts have met with varied, and generally unsuccessful, results. To date, the prior methods suffer from one or more deficiencies, for example, limp, soggy, greasy, or dehydrated reconstituted food products that do not approximate the total eating experience of deep fat fried food products.

More recently, attention has been directed to food products that can be reconstituted in a microwave oven. In microwave oven reconstitution, high frequency energy is passed through the food product. The power absorption or specific absorption rate for a particular food product depends upon a variety of physical and chemical factors, such as frequency, product temperature, the magnitude of the electric field in the product, density and dielectric constants. The high frequency energy excites polar molecules contained within the food product, such as water, and heat is generated.

Due to the large amount of water typically present in microwaveable food products, the food products actually are being cooked in the microwave oven rather than being reconstituted, i.e., reheated. The heating caused by the action of microwave energy upon the water within the food product also often causes structural damage in the form of collapsed areas. In addition, during microwaving, the moisture in the food product is driven outward, thereby causing the exterior to become soggy.

Investigators have attempted to provide frozen food products that, after reconstitution in a microwave oven, exhibit the palatable and esthetically-pleasing properties exhibited by frozen food products reconstituted by deep fat frying. Due to the nature of microwave oven reconstitution, it has been difficult to provide a frozen food product that responds to consumer demands for palatability and esthetics after reconstitution.

Therefore, a major objective of frozen food processors is to provide frozen food products, like French fries, that can be reconstituted by any heat-generating device and exhibit the taste, color, odor, and textural properties for optimum consumer acceptance. For example, it is highly desirable to provide parfried and frozen French fries which, after reconstitution, exhibit a light and tender, but crispy, exterior surface, encasing a soft interior having a moistness level which is neither too dry nor too soggy. However, achieving these desired product characteristics generally has been possible only when the French fries are reconstituted by finish frying in hot oil. Reconstitution of the French fries by alternative means, such as microwave oven heating, generally has resulted in French fries that either are too limp and soggy or are undesirably dry, leathery, and tough.

A publication entitled "Solving the Problem of 'Microwave Browning'", Anon., Food Engineering, 53(9), pp. 98–100 (1981) reviews attempts to impart esthetic properties, like browning, to microwaveable foods, including meats, poultry and French fries. The publication discloses adding browning aids to meats, and changing process conditions in the preparation of French fries.

Various proposals have been made with respect to modifying parfry processing conditions and/or the shape of parfried and frozen food products, and especially French fries, in an effort to improve taste and textural characteristics, particularly when the food products are reconstituted rapidly in a microwave oven. As used here and hereinafter, the term "parfrying" refers to the partial frying of a food product to a degree less than that of a fully cooked or "finish fried" food product.

Shanbhag et al. U.S. Pat. Nos. 4,931,296 and 5,004,616 disclose frozen French fries dust-coated with potato-derived granules either prior to or after frying the French fries. The subsequently frozen French fries can be reconstituted in a microwave oven.

Makishima et al. U.S. Pat. No. 4,839,192 discloses microwaveable French fries that are simultaneously microwaved and fried in an edible oil. The disclosed process avoids shrinkage and deformation of the French fries, and the French fries are sufficiently dehydrated to give a crisp mouthfeel.

Pinegar U.S. Pat. No. 4,590,080 discloses a method of preparing frozen French fries comprising two parfrying steps, with intermediate cooling. The frozen French fries can be reconstituted in a microwave oven.

Present-day frozen food products continue to exhibit undesirable esthetic properties when reconstituted in a microwave oven, a regular oven or convection oven. Optimum esthetic properties are obtained only by subjecting the frozen food product to a finish deep fat frying step. Therefore, a need exists for different types of frozen food products that can be reconstituted quickly and easily by any one of several methods, including microwave oven heating, convection oven heating or finish frying, to provide a highly-palatable reconstituted food having optimized taste, color, and textural properties.

The present invention overcomes the problems and disadvantages associated with prior frozen food products by providing a batter coating for the frozen food products. A frozen food product comprising a foodstuff coated with a batter of the present invention can be reconstituted by any available heating means, including a microwave oven, to provide a reconstituted frozen food product that exhibits palatability and esthetic properties equivalent to a frozen food product reconstituted in a deep fat fryer.

SUMMARY OF THE INVENTION

The present invention relates to food products suitable for reheating in a heating source, such as a microwave oven. The reheated, i.e., reconstituted, food products are bitextural upon microwave reheating, having a relatively crisp exterior portion comprising a batter and an interior portion that is tender. The composition of the microwave-reheated food product is substantially the same as the frozen food product.

The present invention also relates to a microwave-reconstituted food product, such as French fries, that is bitextural and has a coating of a batter that provides a relatively crisp texture to the exterior portion of the coated foodstuff and a fluffy, light interior. The composition of the microwave-reconstituted food product is substantially the same as the frozen food product.

Therefore, one aspect of the present invention relates to frozen food products, such as French fried potatoes, suitable for subsequent microwave reheating, without further cooking, to obtain a food product having a crisp exterior and a tender interior. The food product comprises a relatively thin coating of a batter that adheres to the surface of a foodstuff.

In particular, the present invention relates to a batter mix for frozen food products, wherein a foodstuff having a coating of the batter mix can be reconstituted in a microwave oven, a regular oven or a convection oven to provide a reconstituted food product having a crisp exterior and a moist interior. More particularly, the present invention relates to a batter mix comprising:

(a) a leavening agent comprising:
(i) a water-soluble carbonate salt, and
(ii) a leavening acid;
(b) a starch blend comprising;
(i) a high amylose starch, and
(ii) a starch;
(c) dextrin; and
(d) a food gum.

The batter mix further comprises a filler, like wheat flour or rice flour, and flavor enhancers, like sucrose or salt.

The batter mix of the present invention, after dispersion in water, can be applied to a foodstuff, such as cut potatoes, poultry, meat, fish or vegetables, like carrots, onion rings, cauliflower or zucchini. After processing and freezing, the resulting frozen food product can be reheated by means of a microwave oven, a regular oven, a convection oven or a deep fat fryer. When reconstituted in a microwave oven, the batter-coated frozen food product does not require a receptor board or special microwave dish. Microwave reconstitution can be performed by positioning the food product on cardboard or a paper plate.

Therefore, in accordance with one important aspect of the present invention, the dry batter mix comprises flour in addition to:

(a) about 1.5% to about 9% by weight of a leavening agent, said leavening agent comprising a carbonate salt and a leavening acid, such as sodium acid pyrophosphate, wherein the weight ratio of leavening acid to carbonate salt is in the range of about 4 to 1 to about 1 to 1;

(b) about 5% to about 40% by weight of a starch blend comprising:
(i) a high amylose starch, and
(ii) a starch, wherein the weight ratio of starch to high amylose starch is in the range of about 5.5 to 1 to about 1 to 1;

(c) about 1% to about 8% by weight dextrin, wherein the weight percent of dextrin in the batter mix is inversely related to the weight percent of the leavening agent; and (d) about 0.1% to about 2% by weight of a food gum.

The dry batter mix also can include optional ingredients, such as sweeteners, like sucrose; salt; additional fillers; flavorings; seasonings; and dyes.

In accordance with another important aspect of the present invention, the dry batter mix is dispersed in water to form a batter. The batter comprises water and about 40% to about 60% by weight of the dry batter mix, and is applied to a foodstuff as a relatively thin coating. The batter-coated food product is processed, such as parfried, then frozen for eventual distribution to consumers. The frozen food product can be reconstituted in a microwave oven to provide a reheated food product having the palatability and esthetic properties of a food product reconstituted by deep fat frying.

The batter-coated frozen food products are stored at freezer temperatures for later reheating in a microwave oven. The microwave reheated food product has a color, texture, mouthfeel and taste that closely resembles commercially-prepared food products, like French fries, that have been reconstituted by deep fat frying.

It is therefore an aspect of the present invention to provide a parfried frozen food product which, after reconstitution in a microwave oven, closely resembles the flavor, aroma, texture, mouthfeel and total eating experience of a deep-fat fried reconstituted food product. Another aspect of the present invention is to provide a microwaveable food product that does not become soggy or limp upon reconstitution and that does not suffer from the structural collapse observed in prior microwaveable food products.

Another aspect of the present invention is to provide a microwaveable French fried potato product that can be reconstituted in a convenience store or at home in a short time period, i.e., about four minutes or less for an ordinary serving, that is virtually indistinguishable from deep fat fried French fried potatoes purchased in fast food restaurants.

These and other aspects and novel features of the present invention will become apparent from the following detailed description of the preferred embodiments.

DETAILED DESCRIPTION OF THE PREFERRED EMBODIMENTS

Present-day frozen food products, when reconstituted in a deep fat fryer, provide a reheated food product having a crisp exterior and a moist interior. The reconstituted food product also exhibits the taste, color, odor and texture that consumers equate to palatability. However, the same frozen food product, when reconstituted in a regular oven, a convection oven, or especially, a microwave oven, often has unpalatable properties, such as a soggy and pale exterior and a tough interior.

Numerous attempts have been made to provide a frozen food product that can be reconstituted in an oven, and especially a microwave oven, to yield a palatable, consumer-acceptable reconstituted food product. Many of these attempts were directed to the shape of the frozen food product and to methods of processing the food product prior to freezing.

The present invention is directed to improving the palatability and esthetic properties of a reconstituted food product by coating a foodstuff with a batter composition prior to processing and freezing the food product. A frozen food product coated with a batter comprising the batter mix of the present invention can be reconstituted in a microwave oven to provide a reheated food product having the properties that consumers equate to palatability. Furthermore, a frozen food product coated with the present batter mix can be reconstituted in a microwave oven on merely cardboard or a paper plate, and does not require a receptor board or specially-designed microwave dishes.

Therefore, in accordance with an important feature of the present invention, a batter mix for frozen foods that improves the palatability and esthetic properties of oven-reconstituted foods has been developed. In general, the present batter mix provides a frozen food product that has a crisp exterior and moist interior after oven reconstitution, without imparting any adverse properties to the reconstituted food product. The food product, prior to processing and freezing, does not require extra and time-consuming processing steps, like two separate parfrying steps, and does not require a special shape. A foodstuff merely requires having a relatively thin coating of the batter mix of the present invention applied thereon prior to parfrying and freezing.

As previously stated, the present batter mix comprises a leavening agent, a blend of starches, dextrin and a food gum. The batter mix also includes a filler, like flour, and other optional ingredients, like sweeteners, salt, flavorings and dyes. The present batter mix provides a palatable and esthetically-pleasing reconstituted food product by:

(1) utilizing a particular range for the weight ratio of carbonate salt to leavening acid in the leavening agent;
(2) utilizing a blend of starch materials and a particular range for the weight ratio of starch to high amylose starch; and
(3) balancing the amount of dextrin in the batter mix with the amount of leavening agent.

The leavening agent comprises a water-soluble carbonate salt and a leavening acid. The carbonate salt preferably is sodium bicarbonate because of economics and because a bicarbonate liberates carbon dioxide at a lower temperature and in the presence of less leavening acid than a carbonate. However, sodium carbonate, potassium carbonate, potassium bicarbonate, ammonium carbonate, ammonium bicarbonate or other carbonate and bicarbonate salts conventionally used in food products can be used as the carbonate salt of the leavening agent.

The leavening acid of the leavening agent is not limited to any particular acid, except that the leavening acid is a solid compound. Typically, the leavening acid is a weak acid having sufficient acidity to release carbon dioxide from the carbonate salt upon exposure to heat, i.e., during the parfrying step in the preparation of the frozen food product. Typical leavening acids include, but are not limited to, sodium acid pyrophosphate, potassium acid pyrophosphate, tartaric acid, potassium bitartrate, monobasic calcium phosphate and sodium aluminum phosphate. A preferred leavening acid is sodium acid pyrophosphate.

The leavening agent is present in the batter mix in an amount of about 1.5% to about 9%, and preferably about 2% to about 7%, by weight of the combined amounts of the carbonate salt and leavening acid. To achieve the full advantage of the present invention, the leavening agent is present in an amount of about 2.5% to about 5%, by weight of the combined amount of the carbonate salt and leavening acid.

In accordance with another important feature of the present invention, the weight ratio of leavening acid to carbonate salt in the leavening agent is about 4 to 1 to about 1 to 1, and preferably about 3 to 1 to about 1 to 1. To achieve the full advantage of the present invention, the weight ratio of leavening acid to carbonate salt is about 2 to 1 to about 1.25 to 1.

In addition to the leavening agent, the present batter mix incorporates a combination of starches comprising: (i) a high amylose starch and (ii) a modified or unmodified starch. The combination of starches is present in the batter mix in a total amount of about 5% to about 40%, and preferably about 10% to about 30%, by weight of the composition. To achieve the full advantage of the present invention, the combination of starches is present in the batter mix in a total amount of about 15% to about 25% by weight of the composition.

In accordance with another important feature of the present invention, the combination of starches has a weight ratio of starch to high amylose starch of about 5.5 to 1 to about 1 to 1, and preferably about 5.5 to 1 to about 3 to 1. To achieve the full advantage of the present invention, the weight ratio of starch to high amylose starch is about 5.5 to 1 to about 4 to 1. Within this range, and as will be demonstrated hereinafter, the batter mix has a sufficient amount of high amylose starch and starch for the batter mix to sufficiently adhere to the food product for processing, and to provide a crisp food product after reconstitution.

The starch included in the batter mix can be an unmodified or a modified starch derived from any conventional starch source, such as corn or potato. Due to economics and the properties desired in a batter mix, corn starch is the preferred starch. An example of a modified starch is the pregelatinized starch, INSTANT CLEAR JELL, available from National Starch Co., Bridgewater, N.J. The starch is included in the batter mix primarily to provide adhesive properties. The starch permits the batter mix, after dispersion in water, to adhere to a foodstuff. The batter requires sufficient adhesion such that a coating of the batter remains on the foodstuff until the parfrying step is complete.

It is important that a sufficient amount of a high amylose starch, preferably a high amylose corn starch, is included in the batter mix. As used here and hereinafter, a "high amylose starch" is defined as a starch product comprising at least about 30%, and up to about 85%, amylose. Preferably, the high amylose starch comprises about 40% to about 70% amylose. The term "starch"

therefore refers to a starch product other than a high amylose starch.

The high amylose starch provides crispiness to the food product, which is desired by consumers. The presence of a sufficient amount of a high amylose starch in the batter mix provides a frozen food product that exhibits excellent crispiness and texture after reconstitution in a microwave oven. The combination of a high amylose starch and a starch is important in order to provide a batter mix that is sufficiently adherent to the food product during processing; and that imparts a tender and crisp exterior texture to the reconstituted food product.

The present batter mix also includes about 1% to about 8%, and preferably about 2% to about 6%, by weight of dextrin. To achieve the full advantage of the present invention, dextrin is present in the batter mix in an amount of about 2.5% to about 5%, by weight. The dextrin provides a tender bite and an improved mouthfeel to the reconstituted food product.

The particular amount of dextrin included in the batter mix is inversely related to the amount of leavening agent present in the batter mix. Therefore, as the amount of leavening agent in the batter is increased, the amount of dextrin in the batter mix is decreased, and vice versa. The dextrin mitigates the effects of the leavening agent and provides a more tender crispiness. However, if too much dextrin is included in the batter mix, the reconstituted food product has a greasy mouthfeel.

The batter mix also includes about 0.1% to about 2%, and preferably about 0.2% to about 1%, by weight of the batter mix of a food gum. To achieve the full advantage of the present invention, the batter mix includes about 0.25% to about 0.5% of a food gum.

The food gum is included in the batter mix to increase the viscosity of the batter after dispersion in water. The food gum also contributes to the cell structure of the batter, and thereby contributes to the unique crispness of the reconstituted food product. The starch combination also contributes to the viscosity of the batter.

The food gum included in the present batter mix is not necessarily limited, and can be any food gum normally used in a frozen food product. Exemplary food gums include, but are not limited to, locust bean gum, quince gum, guar gum, gum tragacanth, gum arabic, ghatti, gum karaya, agar, xanthan gums, carrageenan, alginates, and similar food gums, and mixtures thereof. Guar gum and xanthan gums are preferred food gums.

The amounts of leavening agent, combination of starches, dextrin and food gum in the batter mix are selected to provide a frozen food product that can be reconstituted in a microwave oven and that exhibits the desirable properties of a crisp exterior and a moist interior. A frozen food product comprising a foodstuff coated with a batter of the present invention can be reconstituted in a microwave oven or a deep fat fryer, and the resulting reconstituted food product exhibits essentially identical properties with respect to palatability and esthetics.

The batter mix also includes up to 80%, and typically about 40% to about 80%, by weight, of a filler, like flour. The flour can be wheat flour, rice flour, corn meal, or any other grain flour conventionally used in batter mixes. The preferred flour is wheat flour because wheat flour imparts a soft, tender consistency to the reconstituted product. To achieve the full advantage of the present invention, the filler is a combination of wheat flour and rice flour, wherein the rice flour is present in an amount of about 1% to about 10% by weight of the batter mix, and the remaining amount of filler is wheat flour. The rice flour is included to improve the mouthfeel of a reconstituted food product.

The batter mix also can include optional ingredients to achieve a desired property for enhanced consumer acceptance. The amount of each optional ingredient included in the composition is at least that amount sufficient for the ingredient to perform its intended function. Typically, an optional ingredient is included in the batter mix in an amount of up to about 15% by weight. The total amount of optional ingredients in the batter mix typically is up to about 30% by weight.

For example, the batter mix can include a sweetener, such as sucrose or fructose. The sweetener also contributes to the crispy exterior of the reconstituted food product. A sweetener is included in the present batter mix in an amount of 0% to about 10%, and preferably 0% to about 7%, by weight of the batter mix.

The batter mix also can include 0% to about 15% by weight salt to improve the flavor imparted by the batter mix. Typically, the batter mix includes up to about 12% by weight salt. In addition to salt, the batter mix also can include flavorings, such as a meat flavoring, like beef, or a seasoning, like paprika, onion, garlic or pepper. The particular flavor or seasoning is selected for a particular food product and to satisfy a particular consumer taste. Colors or dyes also can be added as necessary or desired. Other optional ingredients known to those skilled in the art also can be included in the batter mix in a sufficient amount to perform their intended function.

A preferred batter mix of the present invention comprises the following ingredients in the following weight percent ranges. The batter mix also can include other optional ingredients to achieve a particular property for a particular frozen food or consumer preference.

| Ingredient | Weight Range (%) |
| --- | --- |
| Flour | 40–80 |
| Starch | 6.5–30 |
| High Amylose Starch | 1.5–6 |
| Dextrin | 1–8 |
| Leavening Acid | 1–5 |
| Carbonate Salt | 0.5–4 |
| Food Gum | 0.1–2 |
| Sweetener | 2–10 |
| Salt | 3–12 |
| Flavorings/Seasonings | q.s. |

A batter mix of the present invention is prepared by simply admixing the composition ingredients, in any order, until the mixture is homogeneous. The resulting batter mix is dispersed in sufficient water to provide a batter comprising about 40% to about 60% by weight of the batter mix. The batter can be made in batches or in a continuous process.

The batter can be coated onto a variety of foodstuffs such as potatoes, meat, fish, poultry and vegetables. The coated food product then is processed, such as parfried, and frozen for distribution to the consumer. The following is a detailed description of the processing of a food product having a batter comprising a present batter mix applied thereon. The following detailed description is directed, but not limited, to French fries. The processing of batter-coated French fries is similar to the processing of batter-coated onion rings, cauliflowers zucchini, carrots, mushrooms, chicken strips, fish sticks and other frozen meat, poultry, fish or vegetable products.

In the manufacture of French fries, the potatoes are cleaned, peeled and cut into strips of a predetermined size and shape. The cut potato strips then are water-blanched. In particular, blanching is usually carried out by exposing the raw cut potato strips to either water or steam for a suitable time and temperature well known to those skilled in the art.

Blanching has a leaching effect on sugars present in the potato strips and serves to even sugar levels throughout the potato strips in order to prevent the production of dark or uneven colored finished French fries. Enzymes, which are the main cause of dark or unevenly colored French fries, are inactivated in the blanching step.

The blanched potato strips are dried, then coated with a relatively-thin layer of a batter comprising about 40% to about 60% water and about 40% to about 60% of a present batter mix. The batter is held in a continuously stirred holding tank, and is pumped to a batter applicator. The batter applicator applies the batter onto the potato strips as a curtain of batter covering the top sides of the potato strips. The underside and lower portions of the potato strips are coated by a batter puddle maintained directly under the moving product belt. The excess batter is removed by the means of an adjustable "air knife" or blow-off tube mounted directly above the product belt.

The coated potato strips have a layer of batter sufficient to cover the potato strips and provide a coherent coating. Preferably, the potato strips have a batter coating comprising from about 0.3 to about 10 percent by weight of the potato strip. Preferably, the coating comprises about 1 to about 5 percent by weight of the potato strip. To achieve the full advantage of the present invention, the batter coating comprises about 2 to about 4 percent by weight of the potato strip.

After the excess batter is removed from the coated potato strips, the coated potato strips are directed onto a "traveling" deep fat fryer where the coated potato strips are "parfried" for a short a short time (e.g., about 15 to about 60 seconds at a temperature of about 300° F. to about 375° F.) in beef tallow, hydrogenated cotton-seed oil, soybean oil, palm oil, safflower oil, coconut oil, peanut oil or similar oils, or combinations thereof. Parfrying further reduces the moisture content and partially fries the raw coated potato strips.

After the partially-fried potato strips exit the fryer, the resulting French fries are moved into an individual quick frozen freezer. The French fries are frozen, for example, either by placing them directly into a freezer, by first cooling the strips and then freezing them to about 0° F., or by blast freezing them at a temperature of about −25° to about −30° F. The frozen French fries then are packaged as desired, stored and/or shipped for further processing.

Prior batter-coated and frozen French fries were reconstituted in a microwave oven either in the container in which they are purchased, which usually contained a receptor board, or in a special microwaveable dish or pan, for a predetermined amount of time at a certain energy level. Surprisingly, a frozen food product coated with the present batter mix can be reconstituted in several ways, including in a microwave oven, without the need for a receptor board or a special microwave dish.

French fries coated with a batter mix of the present invention can be packaged and reconstituted in a microwave oven as illustrated in the following example. An individual French fry serving, typically a 3 to 4 ounce (oz.) serving sold in a cardboard-type container, is opened to expose the frozen French fries. The cardboard container does not require a receptor board. The opened container can be placed on a regular dinner plate, if desired, and the single serving of French fries is reconstituted, i.e., reheated, in a conventional microwave oven for about 1 to about 4 minutes on "full" power (700 watts). The reconstituted French fries were allowed to cool for about 1 to about 4 minutes before eating. Alternatively, the French fries can be transferred from the container onto a paper plate lined with a paper towel (single layer) and reconstituted. This method is especially useful when the frozen French fries are purchased in bulk pack. In either case, the present batter-coated French fries do not require a receptor board-lined container, or special microwave dishes, in order to produce a crisp and tender reconstituted food product.

The reconstituted French fries had a crisp, golden exterior and a fluffy, light interior. The French fries also had an aroma, flavor, mouthfeel and total eating experience closely resembling that attained by the conventional state of the art deep fat fried fast-food product.

The French fries also can be reconstituted in a regular or convection oven by placing a single layer of the frozen food product on a baking sheet. The baking sheet then is placed in a preheated oven (425° F. regular oven or 375° F. convection oven), and heated until the desired crispness is achieved (about 15–20 minutes). In addition, the French fries can be reconstituted in a deep fat fryer by placing the frozen French fries in a deep-fat fryer preheated to 375° F. The frozen French fries are fried for about 1 to about 2 minutes. The reconstituted French fries are drained for about 1 to 2 minutes, then served.

To demonstrate the batter mixes of the present invention, the following Examples 1 through 5 were prepared, then applied to cut potato strips as described above. After processing of the coated potato strips, the resulting French fries were frozen, stored, then reconstituted at a later date.

| Ingredient | Weight % |
|---|---|
| Wheat Flour | 50.95% |
| Rice Flour | 3.17% |
| Corn Meal | 0.83% |
| Starch[1] | 17.43% |
| High Amylose Starch[2] | 3.14% |
| Dextrin[3] | 4.24% |
| Sodium Acid Pyrophosphate | 2.23% |
| Sodium Bicarbonate | 1.32% |
| Guar Gum | 0.39% |
| Salt (Sodium Chloride) | 10.08% |
| Flavors/Seasonings | 6.22% |

[1] A combination of Starch #77-1727, available from National Starch Co., Bridgewater, NJ (10.43%) and CRISPFILM, available from National Starch Co. (7.00%);
[2] HYLON V, available from National Starch Co.;
[3] Dextrin #78-0280, available from National Starch Co.; and
[4] a combination of paprika oleoresin, capsicum, beef flavor, onion and garlic powder, a blend of white and cayenne pepper, and cajun flavoring.

The batter mix of Example 1 was dispersed in water to form a batter, and the batter was coated onto potato strips cut in the shape of French fries. The coated potato strips were processed, and the resulting French fries were quick frozen. The frozen French fries were reconstituted in a microwave oven to provide spicy French fries having a crisp exterior and a moist interior and closely matching French fries reconstituted in a deep fat fryer.

| Ingredient | Weight % |
| --- | --- |
| Wheat Flour | 52.34% |
| Rice Flour | 3.25% |
| Starch[5] | 17.80% |
| High Amylose Starch[2] | 3.23% |
| Dextrin[3] | 3.44% |
| Sodium Acid Pyrophosphate | 2.90% |
| Sodium Bicarbonate | 1.73% |
| Guar Gum | 0.27% |
| Salt | 7.81% |
| Flavors/Seasonings[6] | 0.13% |

[5]A combination of Starch #77-1727, available from National Starch Co., (10.55%) and CRISPFILM, available from National Starch Co. (7.25%); and
[6]beef flavor.

The batter mix of Example 2 was dispersed in water to form a batter, and the batter was coated onto potato strips cut in the shape of French fries. The coated potato strips were processed, and the resulting French fries were quick frozen. The frozen French fries were reconstituted in a microwave oven to provide French fries having a crisp exterior and a moist interior and closely matching French fries reconstituted in a deep fat fryer.

| Ingredient | Weight % |
| --- | --- |
| Wheat Flour | 51.38% |
| Rice Flour | 3.19% |
| Corn Meal | 0.83% |
| Starch[1] | 17.44% |
| High Amylose Starch[2] | 3.16% |
| Dextrin[3] | 3.42% |
| Sodium Acid Pyrophosphate | 2.25% |
| Sodium Bicarbonate | 1.33% |
| Guar Gum | 0.39% |
| Salt | 10.17% |
| Flavors/Seasonings[4] | 6.44% |

The batter mix of Example 3 was dispersed in water to form a batter, and the batter was coated onto potato strips cut in the shape of French fries. The coated potato strips were processed, and the resulting French fries were quick frozen. The frozen French fries were reconstituted in a microwave oven to provide French fries having a crisp exterior and a moist interior and closely matching French fries reconstituted in a deep fat fryer.

The batter mix of Example 3 was very similar to the batter mix of Example 1, except the amount of dextrin in Example 3 was reduced by about 20%. The reconstituted French fries coated with a batter prepared from the batter mix of Example 3 were slightly less crisp compared to reconstituted French fries coated with a batter prepared from the batter mix of Example 1.

| Ingredient | Weight % |
| --- | --- |
| Wheat Flour | 52.40% |
| Rice Flour | 3.30% |
| Corn Meal | 0.80% |
| Starch[1] | 17.80% |
| High Amylose Starch[2] | 3.24% |
| Dextrin[3] | 2.64% |
| Sodium Acid Pyrophosphate | 1.52% |
| Sodium Bicarbonate | 0.92% |
| Guar Gum | 0.40% |
| Salt | 10.40% |

-continued

| Ingredient | Weight % |
| --- | --- |
| Flavors/Seasonings[4] | 6.58% |

The batter mix of Example 4 was dispersed in water to form a batter, and the batter was coated onto potato strips cut in the shape of French fries. The coated potato strips were processed, and the resulting French fries were quick frozen. The frozen French fries were reconstituted in a microwave oven to provide French fries having a crisp exterior and a moist interior and closely matching French fries reconstituted in a deep fat fryer.

| Ingredient | Weight % |
| --- | --- |
| Wheat Flour | 58.22% |
| Rice Flour | 3.62% |
| Starch[1] | 19.76% |
| High Amylose Starch[2] | 3.57% |
| Dextrin[3] | 2.93% |
| Sodium Acid Pyrophosphate | 1.65% |
| Sodium Bicarbonate | 1.04% |
| Guar Gum | 0.30% |
| Salt | 8.87% |
| Flavors/Seasonings[4] | 0.04% |

The batter mix of Example 5 was dispersed in water to form a batter, and the batter was coated onto potato strips cut in the shape of French fries. The coated potato strips were processed, and the resulting French fries were quick frozen. The frozen French fries were reconstituted in a microwave oven to provide French fries having a crisp exterior and a moist interior and closely matching French fries reconstituted in a deep fat fryer.

The batter mix of Example 5 was very similar to the batter mix of Example 2, except the amount of starch was increased by about 11%. The reconstituted French fries coated with a batter prepared from the batter mix of Example 5 were slightly less crisp compared to reconstituted French fries coated with a batter prepared from the batter mix of Example 2.

The above Examples demonstrate the new batter mixes of the present invention. The batter mixes are applied as a relatively thin coating on foodstuffs to provide a frozen food product that can be reheated in a microwave oven to yield a reconstituted food product having a crisp exterior and a moist interior. The reconstituted food product has an excellent mouthfeel and possesses the palatability and esthetic properties necessary to meet consumer demands. A frozen food product comprising a foodstuff having a coating of a batter mix of the present invention also can be reconstituted in a regular oven, a convection oven or in a deep fat fryer. During reconstitution in a microwave oven, a receptor board or special microwave dish is not required.

The batter mixes can be used to coat a variety of food products, such as for example, potatoes, meats, poultry, fish and vegetables, like onion rings, zucchini, carrots, and cauliflower.

Obviously, many modifications and variations of the invention is hereinbefore set forth can be made without departing from the scope thereof and therefore only such limitations should be imposed as are indicated by the appended claims.

In the claims:

1. A dry batter mix comprising:

(a) about 1.5% to about 9% by weight of a leavening agent comprising:
  (i) a water-soluble carbonate salt, and
  (ii) a leavening acid, wherein a weight ratio of leavening acid to carbonate salt is about 4 to 1 to about 1 to 1;
(b) about 5% to about 40% by weight of a starch blend comprising:
  (i) a high amylose starch, and
  (ii) a starch, wherein a weight ratio of starch to high amylose starch is about 5.5 to 1 to about 1 to 1;
(c) about 1% to about 8% by weight dextrin; and
(d) about 0.1% to about 2% by weight of a food gum;
wherein the weight percent of dextrin is inversely related to the weight percent of the leavening agent.

2. The batter mix of claim 1 further comprising up to about 80% by weight of a filler.

3. The batter mix of claim 2 wherein the filler is selected from the group consisting of wheat flour, rice flour, corn meal, and mixtures thereof.

4. The batter mix of claim 1 wherein the leavening agent is present in an amount of about 2% to about 7% by weight.

5. The batter mix of claim 1 wherein the carbonate salt is selected from the group consisting of sodium bicarbonate, sodium carbonate, potassium carbonate, potassium bicarbonate, ammonium carbonate, ammonium bicarbonate, and mixtures thereof.

6. The batter mix of claim 1 wherein the leavening acid is a solid compound selected from the group consisting of sodium acid pyrophosphate, potassium acid pyrophosphate, tartaric acid, potassium bitartrate, monobasic calcium phosphate, sodium aluminum phosphate, and mixtures thereof.

7. The batter mix of claim 1 wherein the weight ratio of leavening acid to carbonate salt is about 3 to 1 to about 1 to 1.

8. The batter mix of claim 1 wherein the high amylose starch comprises at least about 30% up to about 85% amylose.

9. The batter mix of claim 1 wherein the starch blend is present in an amount of about 10% to about 30% by weight.

10. The batter mix of claim 1 wherein the weight ratio of starch to high amylose starch is about 5.5 to 1 to about 3 to 1.

11. The batter mix of claim 1 wherein dextrin is present in an amount of about 2% to about 6% by weight.

12. The batter mix of claim 1 wherein the food gum is present in an amount of about 0.2% to about 1% by weight.

13. The batter mix of claim 1 wherein the food gum is selected from the group consisting of locust beam gum, quince gum, guar gum, gum tragacanth, gum arabic, ghatti, gum karaya, agar, a xanthan gum, carrageenan, an alginate, and mixtures thereof.

14. The batter mix of claim 1 comprising:
(a) about 2.5% to about 5% by weight of the leavening agent wherein:
  (i) the water-soluble carbonate salt selected from the group consisting of sodium bicarbonate, sodium carbonate, potassium bicarbonate, and mixtures thereof, and
  (ii) the leavening acid selected from the group consisting of sodium acid pyrophosphate, potassium bitartrate, sodium aluminum phosphate, and mixtures thereof, wherein the weight ratio of leavening acid to carbonate salt is about 2 to 1 to about 1.25 to 1;
(b) about 15% to about 25% by weight of the starch blend;
(c) about 2.5% to about 5% by weight of dextrin; and
(d) about 0.25% to about 0.5% by weight of the food gum, said food gum selected from the group consisting of guar gum, agar, a xanthan gum, and mixtures thereof.

15. The batter mix of claim 14 further comprising about 40% to about 80% by weight of a filler selected from the group consisting of wheat flour, rice flour, corn meal, and mixtures thereof.

16. The batter mix of claim 15 wherein the filler comprises rice flour in an amount of about 1% to about 10% by weight of the batter mix, and wheat flour.

17. A batter comprising water and about 40% to about 60% by weight of the dry batter mix of claim 1.

18. A dry batter mix comprising:
(a) a leavening agent comprising:
  (i) about 0.5% to about 4% by weight of a water-soluble carbonate salt, and
  (ii) about 1% to about 5% of a leavening acid;
(b) a starch blend comprising:
  (i) about 1.5% to about 6% by weight of a high amylose starch, and
  (ii) about 6.5% to about 30% by weight of a starch, wherein a weight ratio of starch to high amylose starch is about 5.5 to 1 to about 1 to 1;
(c) about 1% to about 8% by weight dextrin; and
(d) about 0.1% to about 2% by weight of a food gum;
wherein the weight percent of dextrin is inversely related to the weight percent of the leavening agent.

19. A frozen food product comprising a foodstuff having a batter coating applied thereon, said batter coating comprising:
(A) water, and
(B) a dry batter mix comprising:
  (a) about 1.5% to about 9% by weight of a leavening agent comprising:
    (i) a water-soluble carbonate salt, and
    (ii) a leavening acid, wherein a weight ratio of leavening acid to carbonate salt is about 4 to 1 to about 1 to 1;
  (b) about 5% to about 40% by weight of a starch blend comprising:
    (i) a high amylose starch, and
    (ii) a starch, wherein a weight ratio of starch to high amylose starch is about 5.5 to 1 to about 1 to 1;
  (c) about 1% to about 8% by weight dextrin; and
  (d) about 0.1% to about 2% by weight of a food gum;
  wherein the weight percent of dextrin in the dry batter mix is inversely related to the weight percent of the leavening agent.

20. The frozen food product of claim 19 wherein the batter coating comprises about 0.3% to about 10% by weight of the frozen food product.

21. The frozen food product of claim 19 wherein the foodstuff is selected from the group consisting of a vegetable, a meat product, a fish product, and a poultry product.

22. The frozen food product of claim 21 wherein the vegetable is selected from the group consisting of potato, cauliflower, onion, zucchini, mushroom, and mixtures thereof.

23. The frozen food product of claim 19 wherein the frozen food product comprises French fries.

24. A reconstituted frozen food product of claim 19.

25. The reconstituted frozen food product of claim 24 wherein the frozen food product is reconstituted in a microwave oven.

26. A method of reconstituting a frozen, precooked food product comprising subjecting the food product to microwave energy for a sufficient time to heat the food product to a palatable temperature, wherein the frozen food product comprises a foodstuff coated with a relatively thin layer of a batter, and wherein the batter comprises:
(A) water, and
(B) a dry batter mix comprising:
(a) about 1.5% to about 9% by weight of a leavening agent comprising:
(i) a water-soluble carbonate salt, and
(ii) a leavening acid, wherein a weight ratio of leavening acid to carbonate salt is about 4 to 1 to about 1 to 1;
(b) about 5% to about 40% by weight of a starch blend comprising:
(i) a high amylose starch, and
(ii) a starch, wherein a weight ratio of starch to high amylose starch is about 5.5 to 1 to about 1 to 1;
(c) about 1% to about 8% by weight dextrin; and
(d) about 0.1% to about 2% by weight of a food gum;
wherein the weight percent of dextrin in the dry batter mix is inversely related to the weight percent of the leavening agent.

27. The method of claim 26 wherein the food product is reconstituted in a microwave oven in the absence of a reflector board.

28. The method of claim 26 wherein the reconstituted food product has palatable and esthetic properties that are essentially identical to a food product reconstituted in a deep fat fryer.

29. The method of claim 26 wherein the reconstituted food product is heated without further cooking to provide a food product having a crisp exterior and a tender interior.

* * * * *

UNITED STATES PATENT AND TRADEMARK OFFICE
CERTIFICATE OF CORRECTION

PATENT NO. : 5,431,944
DATED : July 11, 1995
INVENTOR : HENNING S. MELVEJ

It is certified that error appears in the above-identified patent and that said Letters Patent is hereby corrected as shown below:

Column 8, line 68, "cauliflowers zuc-" should be --cauliflower, zuc- --.

Column 9, line 42, "for a short a short" should be --for a short--.

Column 10, line 46, before table, insert --EXAMPLE 1--.

Column 11, line 5, before table, insert --EXAMPLE 2--.

Column 11, line 29, before table, insert --EXAMPLE 3--.

Column 11, line 58, before table, insert --EXAMPLE 4--.

Column 12, line 15, before table, insert --EXAMPLE 5--.

Signed and Sealed this

Twenty-seventh Day of February, 1996

*Attest:*

BRUCE LEHMAN

*Attesting Officer*  Commissioner of Patents and Trademarks